(12) United States Patent  
Carnevale et al.

(10) Patent No.: US 8,480,414 B2
(45) Date of Patent: Jul. 9, 2013

(54) UNIVERSAL GROUND BAR SYSTEM

(75) Inventors: John Carnevale, Crest Hill, IL (US); Shaun P. Brouwer, St. John, IN (US); Robert G. Bucciferro, Joliet, IL (US)

(73) Assignee: Panduit Corp., Tinley Park, IL (US)

( * ) Notice: Subject to any disclaimer, the term of this patent is extended or adjusted under 35 U.S.C. 154(b) by 133 days.

(21) Appl. No.: 13/085,792

(22) Filed: Apr. 13, 2011

(65) Prior Publication Data

US 2012/0264327 A1 Oct. 18, 2012

(51) Int. Cl.
*H01R 4/66* (2006.01)
(52) U.S. Cl.
USPC ............................................. 439/97; 439/810
(58) Field of Classification Search
USPC ................. 439/92, 797, 798, 801, 810, 814, 439/95, 97
See application file for complete search history.

(56) References Cited

U.S. PATENT DOCUMENTS

| | | |
|---|---|---|
| 3,133,779 A | 5/1964 | Stanback |
| 3,210,716 A | 10/1965 | Meacham |
| 3,727,171 A | 4/1973 | Coles et al. |
| 3,832,604 A | 8/1974 | Goodridge |
| 4,231,633 A | 11/1980 | Luke et al. |
| 4,500,161 A | 2/1985 | Keglewitsch et al. |
| 5,690,516 A | 11/1997 | Fillinger |
| 5,848,913 A | 12/1998 | Ashcraft |
| 6,939,183 B2 | 9/2005 | Ferretti et al. |
| 7,014,514 B2 | 3/2006 | Zahnen |
| 7,056,163 B2 | 6/2006 | Hay |
| 7,438,607 B2 | 10/2008 | Fong |
| 7,537,467 B1 | 5/2009 | Gretz |
| 7,704,104 B2 | 4/2010 | Duley |
| 7,766,704 B2 | 8/2010 | Robinson et al. |
| 2005/0202732 A1 | 9/2005 | Rizzo et al. |
| 2008/0258912 A1 | 10/2008 | King et al. |

FOREIGN PATENT DOCUMENTS

| | | |
|---|---|---|
| DE | 1058593 B | 6/1959 |
| WO | 9534107 A1 | 12/1995 |
| WO | 0115506 A1 | 3/2001 |
| WO | 0201677 A1 | 1/2002 |
| WO | 2008108613 A1 | 9/2008 |

OTHER PUBLICATIONS

GE Service Entrance Equipment Catalog, p. 1-11, 1999.

*Primary Examiner* — Khiem Nguyen
(74) *Attorney, Agent, or Firm* — Robert A. McCann; Christopher S. Clancy; Aimee E. McVady

(57) ABSTRACT

A ground bar assembly includes a ground bar for attaching to grounding conductors and a conductive mounting bracket directly attached to the ground bar. The conductive mounting bracket is configured to space the ground bar apart from a mounting surface. An isolative mounting bracket and varying ground bar assemblies, for differing functions, are also provided.

10 Claims, 13 Drawing Sheets

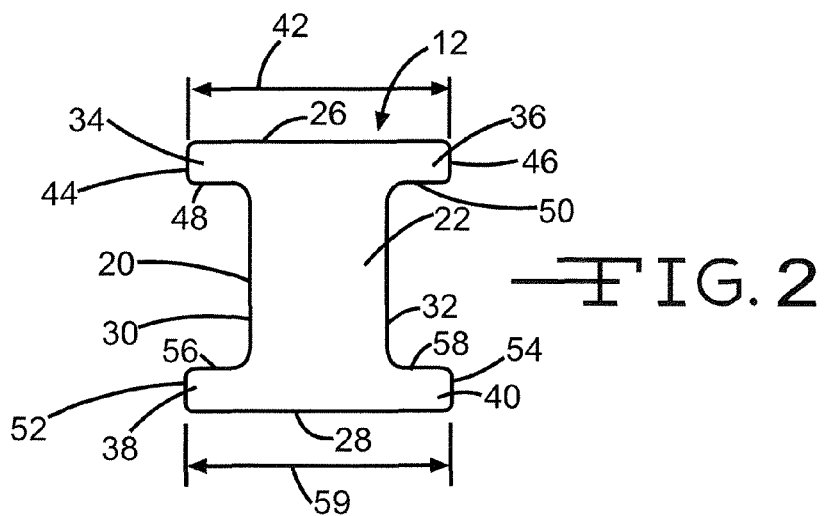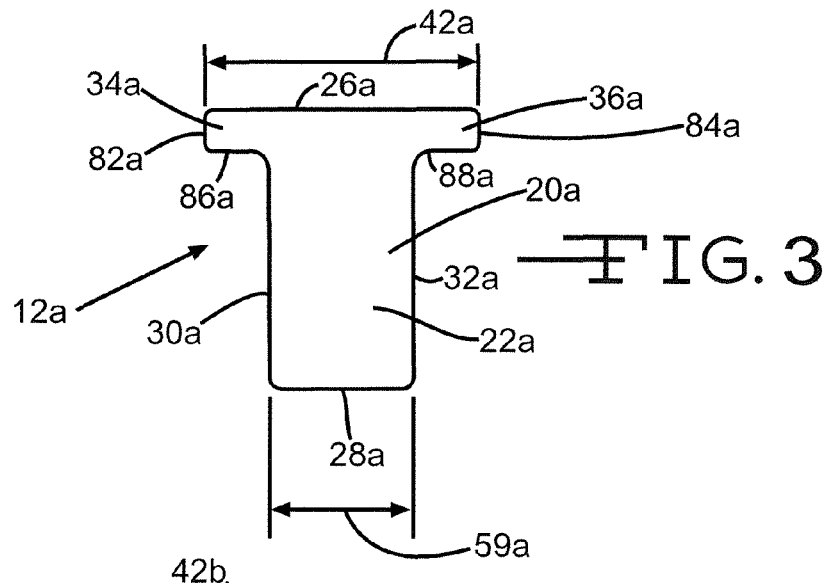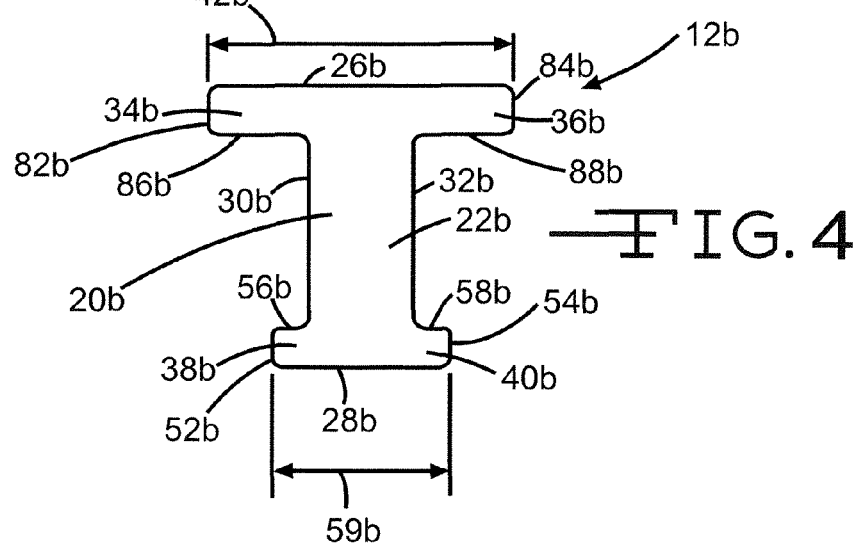

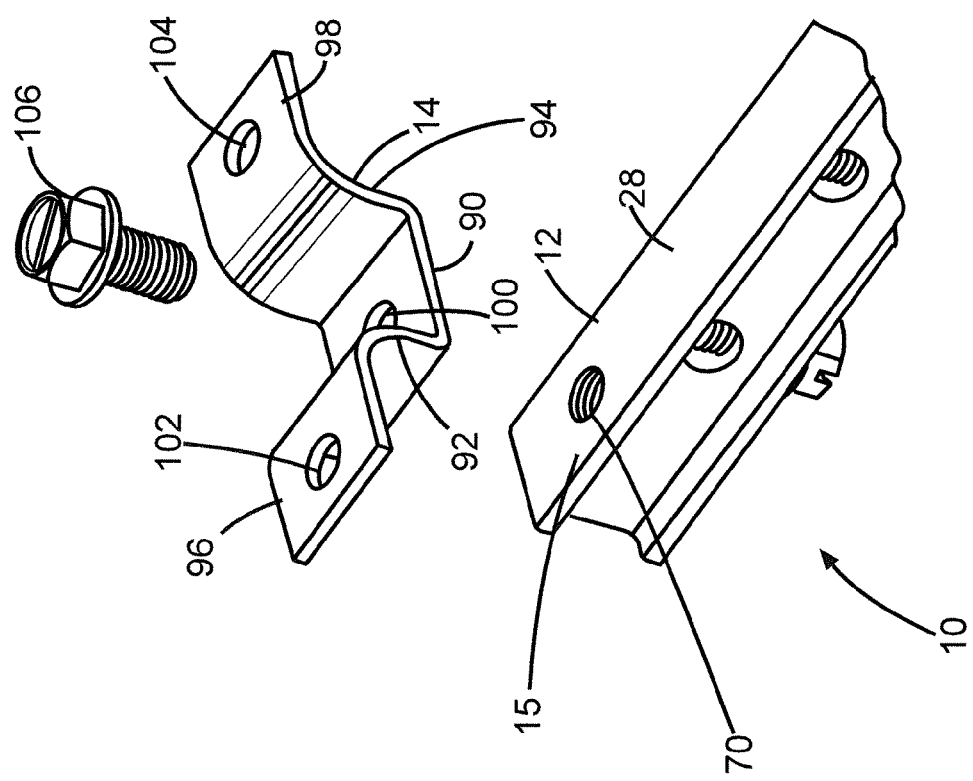

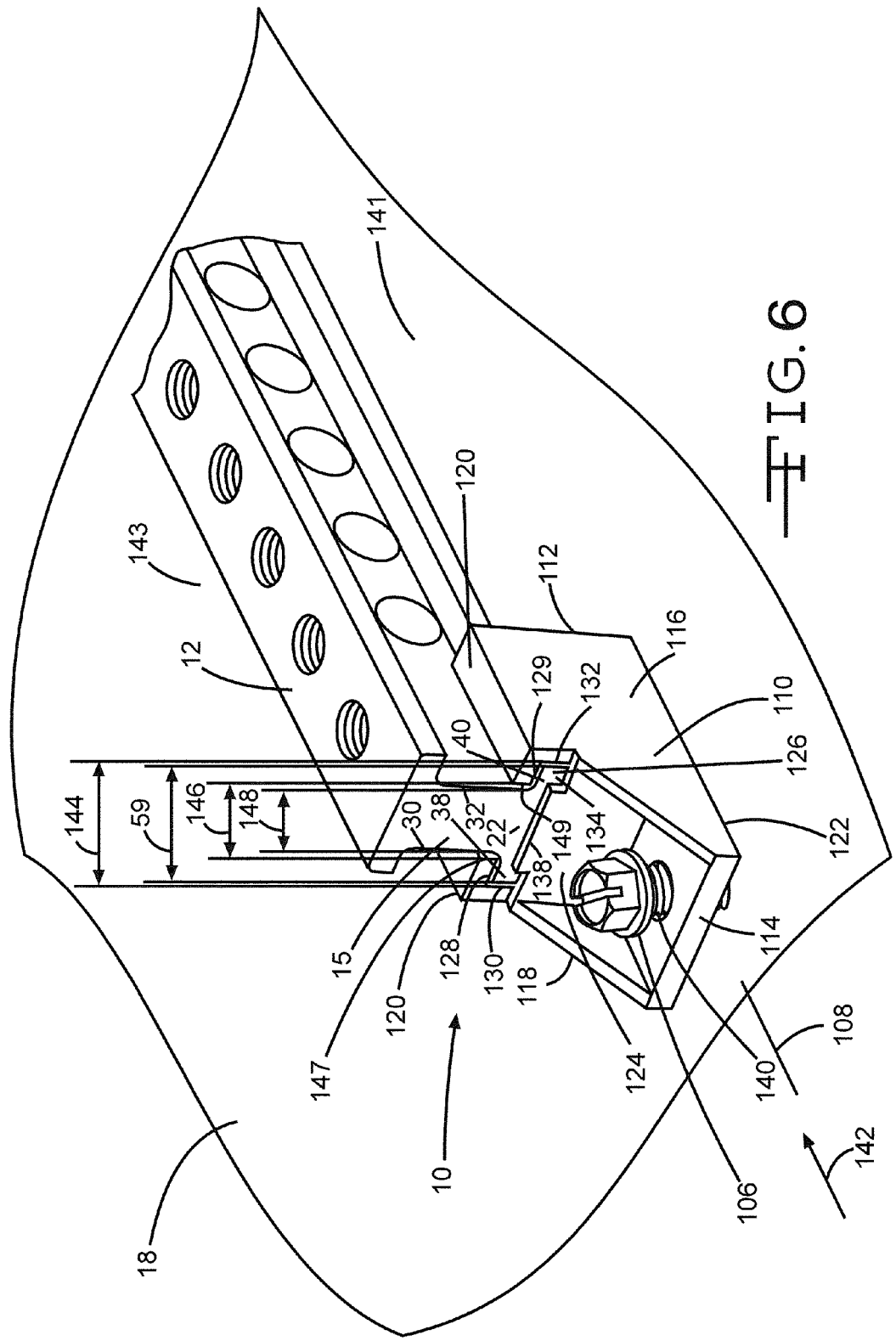

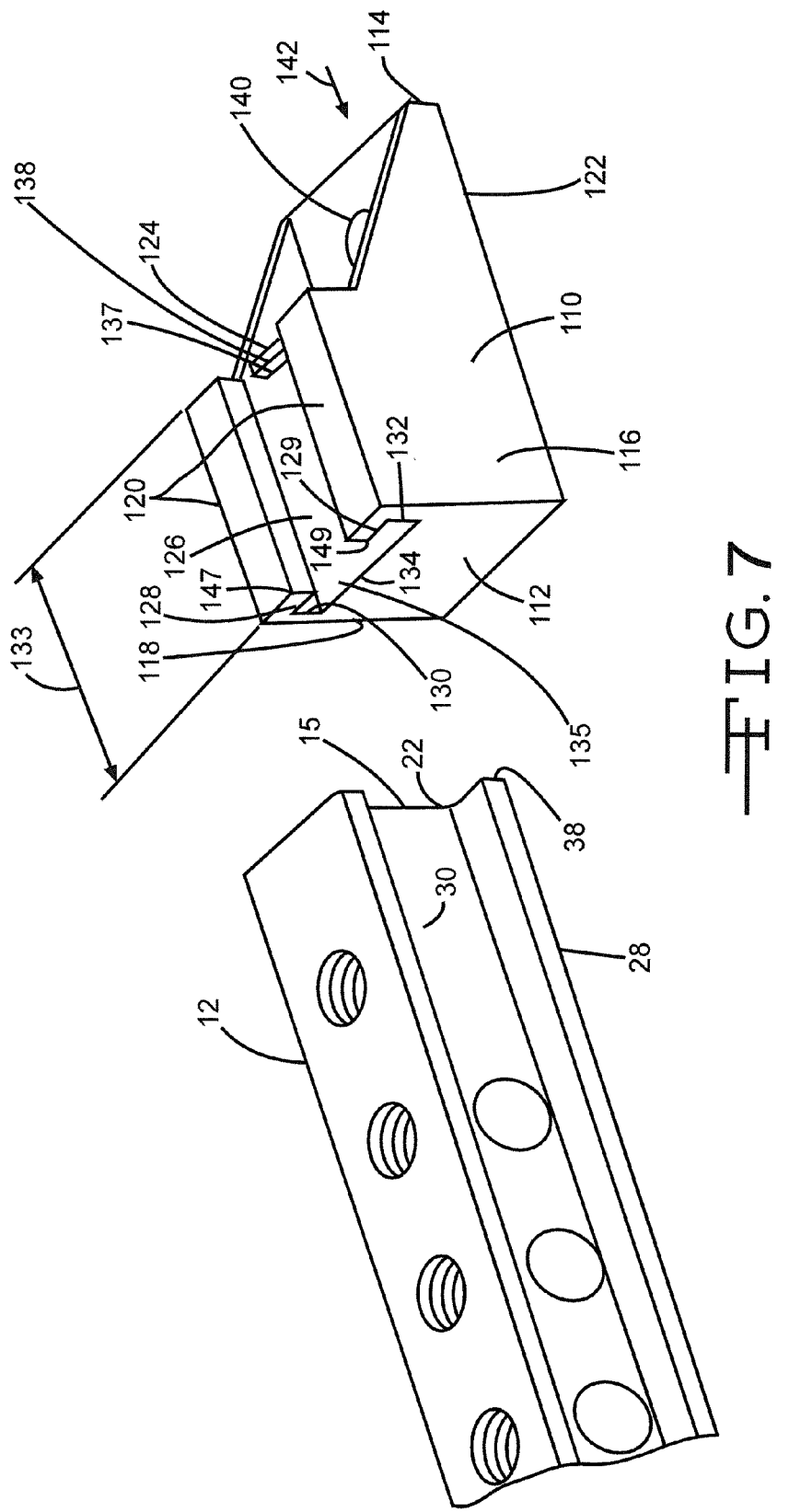

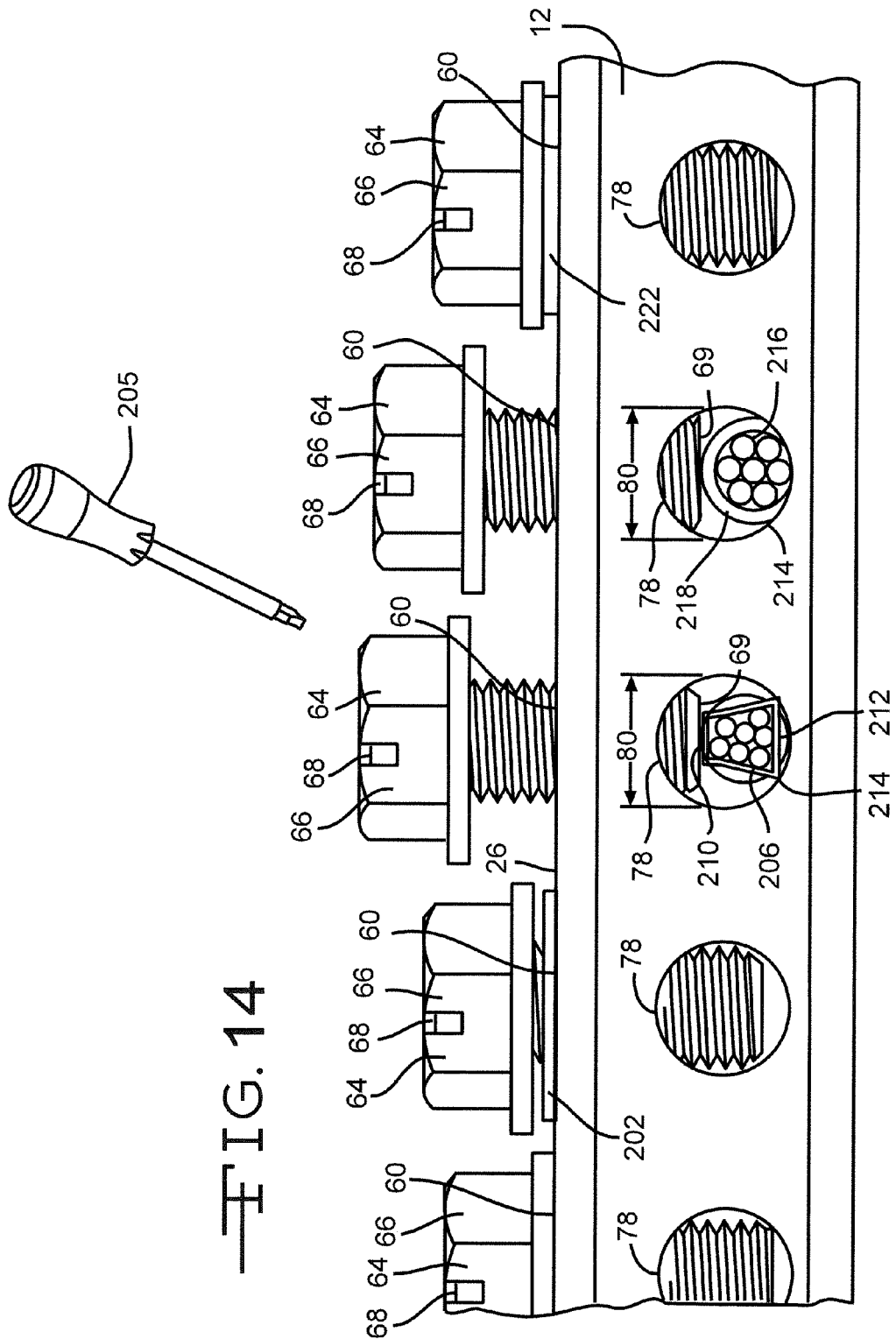

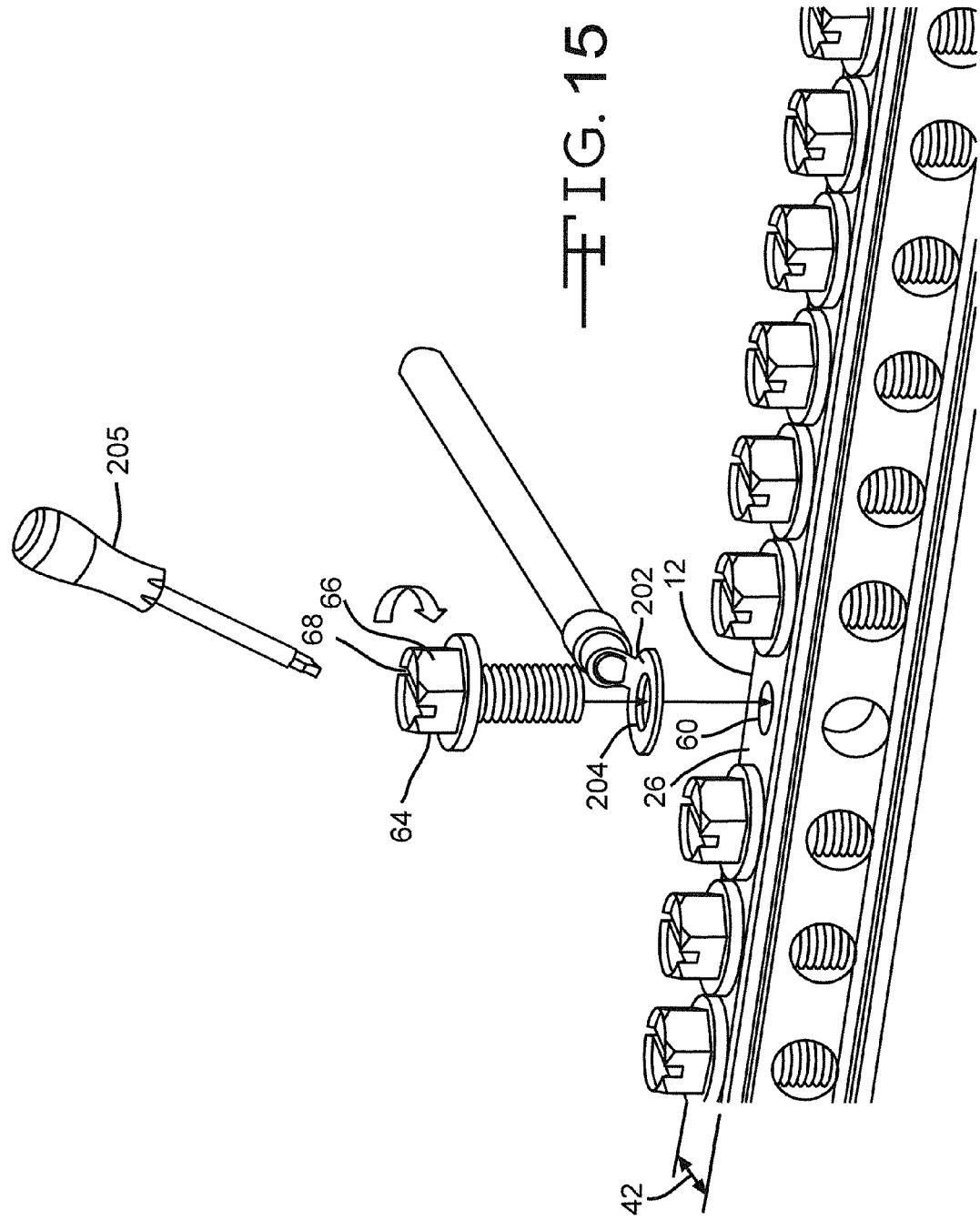

US 8,480,414 B2

UNIVERSAL GROUND BAR SYSTEM

FIELD OF THE INVENTION

This disclosure relates to ground bar assemblies, including ground bars, mounting brackets, and conductor blocks.

BACKGROUND OF THE INVENTION

Ground bar assemblies are used in many electrical and control panels to combine various grounding conductors together which are then bonded to the panel's main grounding conductor. Some of these ground bar assemblies are unable to accept differing types of conductive terminations such as a stripped wire, a ferrule, a ring or fork terminal, and a compression connector. Other ground bar assemblies do not provide conductive mounting brackets for direct attachment to the ground bar to space apart the ground bar from a mounting surface. Still other ground bar assemblies do not provide isolative mounting brackets which allow the attachment of the isolative mounting brackets to a ground bar without fasteners. Additional ground bar assemblies do not provide anti-rotation features to prevent conductor blocks from rotating while being attached to a ground bar.

a universal ground bar assembly is needed to overcome one or more of the issues experienced with prior ground bar assemblies.

SUMMARY OF THE INVENTION

In one aspect of the invention, a ground bar assembly includes a ground bar for attaching to grounding conductors and a conductive mounting bracket directly attached to the ground bar. The conductive mounting bracket is configured to space the ground bar apart from a mounting surface.

In another aspect of the invention, an isolative mounting bracket made of non-conductive material has a bottom surface and a top surface. The top surface includes a slot. The slot has opposed side slot walls for slideably mounting over oppositely disposed surfaces of a ground bar. A hole is disposed in the bottom surface beyond the slot and between the opposed side slot walls.

In an additional aspect of the invention, a ground bar assembly includes a ground bar and a conductor block configured to be attached to the ground bar. The ground bar has a top surface including an anti-rotation slot having opposed slot side walls for preventing rotation of the conductor block.

In still another aspect of the invention, a ground bar assembly includes a ground bar and a conductor block configured to be attached to the ground bar. The conductor block has an anti-rotation ledge extending from a bottom surface of the conductor block for abutting against a surface of the ground bar to prevent rotation of the conductor block.

BRIEF DESCRIPTION OF THE DRAWINGS

FIG. 2 illustrates a cross-section view through the ground bar of FIG. 1.

FIG. 3 illustrates a cross-section through a ground bar of another embodiment having a cross-section in a T-shape.

FIG. 4 illustrates a cross-section through a ground bar of another embodiment having a cross-section in yet another varying shape.

FIG. 5 illustrates a partial bottom perspective view of the universal ground bar assembly of FIG. 1 showing one of the mounting brackets detached from the ground bar.

FIG. 6 illustrates a partial top perspective view of the universal ground bar assembly of FIG. 1 showing an isolative mounting bracket attached to an end of the ground bar.

FIG. 7 illustrates the view of FIG. 6 with the isolative mounting bracket detached from the end of the ground bar.

FIG. 14 illustrates a partial side view of the ground bar of FIG. 1 showing the attachment of varying types of conductive terminations to the ground bar.

FIG. 15 illustrates a partial top perspective view of the ground bar of FIG. 1 showing a screw and ring terminal detached from the ground bar.

DETAILED DESCRIPTION OF THE INVENTION

Figure 1:
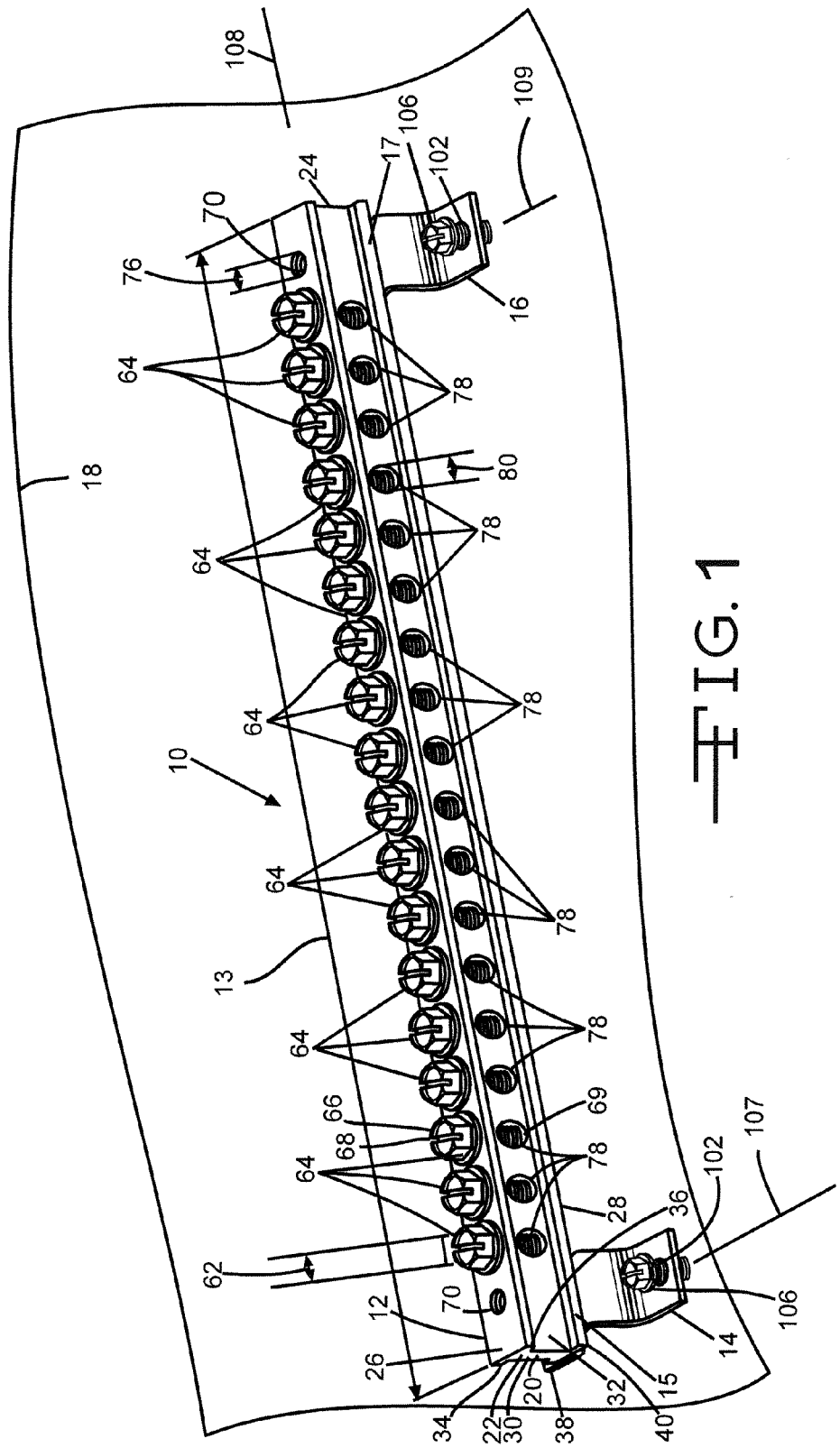
FIG. 1 illustrates a front perspective view of a universal ground bar assembly.

FIG. 1 illustrates a front perspective view of a universal ground bar assembly 10. The universal ground bar assembly 10 includes a ground bar 12 and mounting brackets 14 and 16 directly attached to opposite ends 15 and 17 of the ground bar 12 attaching the universal ground bar assembly 10 to a mounting surface 18. The universal ground bar assembly 10 is configured to attach to various types or numbers of grounding conductors in an electrical or control panel, and to attach to the panel's main grounding conductor, in order to provide additional functionality to solve some of the issues experienced with prior ground bar assemblies. The universal ground bar assembly 10 may be used in industrial automation, building automation, control systems, power systems, telecommunications systems, or other applications where an electrical system is installed.

FIG. 2 illustrates a cross-section view through the ground bar 12 of FIG. 1. The ground bar 12 is extruded using a conductive material such as bare copper, tin-plated copper, aluminum, tin-plated aluminum, bronze, or other types of conductive material. The extrusion process allows for easy size, shape, and configuration changes in the ground bar 12. In other embodiments, the ground bar 12 may be manufactured using varying manufacturing processes or other types of materials. As shown in FIG. 1, the ground bar 12 has a length 13 of 11.64 inches. In other embodiments, the length 13 of the ground bar 12 may be 4.92 or 8.28 inches. In still other embodiments, the length of the ground bar 12 may vary. As shown in FIGS. 1 and 2, the ground bar 12 has a generally I-shaped cross-section 20. The I-shaped cross-section 20 increases the stability and bending strength of the ground bar 12 over other shaped cross-sections.

As shown in FIGS. 1 and 2, the ground bar 12 has opposed parallel end surfaces 22 and 24, opposed parallel top and bottom surface 26 and 28, opposed parallel side walls 30 and 32, two top flanges 34 and 36, and two bottom flanges 38 and 40. The parallel top surface 26 has a width 42 of 0.62 inches. In other embodiments, the width 42 of the parallel top surface 26 may be in a range of 0.60 to 0.64 inches. In still other embodiments, the width 42 of the parallel top surface 26 may vary. The large size parallel top surface 26 allows for a large area to land terminals such as ring terminals. The two top flanges 34 and 36 extend between the top surface 26 and the respective side walls 30 and 32, and comprise parallel top flange side walls 44 and 46 and curved top flange bottom surfaces 48 and 50. The two bottom flanges 38 and 40 extend between the bottom surface 28 and the respective side walls 30 and 32, and comprise parallel bottom flange side walls 52 and 54 and curved bottom flange top surfaces 56 and 58. The bottom surface 28 has a width 59 of 0.62 inches. In other embodiments, the width 59 of the bottom surface 28 may be in a range of 0.60 to 0.64 inches. The two bottom flanges 38 and 40 are shaped to allow other devices, such as conductive or isolative brackets, to grasp onto them.

As shown in FIG. 1, eighteen top threaded holes 60 extend from the top surface 26, into the cross-section 20, and end in the cross-section 20 without going through the bottom surface 28. The eighteen top threaded holes 60 (shown in FIG. 18) have a diameter 62 of 0.25 inches. In another embodiment, the eighteen top threaded holes 60 may have a diameter 62 in a range of 0.23 to 0.27 inches. Eighteen screws 64 are attached to the top threaded holes 60. The eighteen screws 64 have hexagonal ends 66 with slots 68 making it easy to rotate the screws 64 with a screw-driver or wrench. The other ends 69 of the screws 64 are chamfered with flat bottom surfaces. In other embodiments, the screws 64 may have varying shaped or configured ends 66 and 69.

Two top threaded end holes 70 are disposed at the opposite ends 15 and 17 of the ground bar 12. The two top threaded end holes 70 extend from the top surface 26, through the cross-section 20, and through the bottom surface 28. The two top threaded end holes 70 have a diameter 76 of 0.25 inches. In another embodiment, the two top threaded end holes 70 may have a diameter 76 in a range of 0.23 to 0.27 inches. The two top threaded end holes 70 may either have screws attached to them (not shown) or may be left without screws attached to them as shown to provide clearance for the screws 64 in the top threaded holes 60. Eighteen side holes 78 extend between the opposed parallel side walls 30 and 32 with each of the eighteen side holes 78 intersecting within the cross-section 20 with a corresponding one of the eighteen top threaded holes 60. The eighteen side holes 78 have a diameter 80 of 0.281 inches. In another embodiment, the eighteen side holes 78 may have a diameter 80 in a range of 0.271 to 0.291 inches. In other embodiments, the ground bar 12 may have varying numbers, sizes, or configurations of top threaded holes 60, top threaded end holes 70, or side holes 78.

FIG. 3 illustrates a cross-section through a ground bar 12a of another embodiment having a cross-section 20a in a T-shape. Although hidden in this view, the ground bar 12a of FIG. 3 may have the same top threaded holes 60 (shown in FIG. 18), top threaded end holes 70, and side holes 78 as shown in the ground bar 12 of the embodiment of FIG. 1. The ground bar 12a has opposed parallel end surfaces 22a (the other opposed parallel end surface is hidden in this view), opposed parallel top and bottom surfaces 26a and 28a, opposed parallel side walls 30a and 32a, and two top flanges 34a and 36a. The parallel top surface 26a has a width 42a of 0.62 inches. In other embodiments, the width 42a of the parallel top surface 26a may be in a range of 0.60 to 0.64 inches. In still other embodiments, the width 42a of the parallel top surface 26a may vary. The large size parallel top surface 26a allows for a large area to land terminals such as ring terminals. The bottom surface 28a has a width 59a of 0.315 inches. In other embodiments, the width 59a of the bottom surface 28a may be in a range of 0.295 to 0.335 inches. The smaller sized bottom surface 28a reduces the amount of material needed to manufacture the ground bar 12a, thereby decreasing its manufacturing cost. The two top flanges 34a and 36a extend between the top surface 26a and the respective side walls 30a and 32a, and comprise parallel top flange side walls 82a and 84a and curved top flange bottom surfaces 86a and 88a.

FIG. 4 illustrates a cross-section through a ground bar 12b of another embodiment having a cross-section 20b in yet another varying shape. Although hidden in this view, the ground bar 12a of FIG. 4 may have the same top threaded holes 60, top threaded end holes 70, and side holes 78 as shown in the ground bar 12 of the embodiment of FIG. 1. The ground bar 12 has opposed parallel end surfaces 22b (the other opposed parallel end surface is hidden in this view), opposed parallel top and bottom surfaces 26b and 28b, opposed parallel side walls 30b and 32b, two top flanges 34b and 36b, and two bottom flanges 38b and 40b. The parallel top surface 26b has a width 42b of 0.62 inches. In other embodiments, the width 42b of the parallel top surface 26b may be in a range of 0.60 to 0.64 inches. In still other embodiments, the width 42b of the parallel top surface 26b may vary.

The large size parallel top surface 26b allows for a large area to land terminals such as ring terminals. The two top flanges 34b and 36b extend between the top surface 26b and the respective side walls 30b and 32b, and comprise parallel top flange side walls 82b and 84b and curved top flange bottom surfaces 86b and 88b. The two bottom flanges 38b and 40b extend between the bottom surface 28b and the respective side walls 30b and 32b, and comprise parallel bottom flange side walls 52b and 54b and curved bottom flange top surfaces 56b and 58b. The bottom surface 28b has a width 59b of 0.438 inches. In other embodiments, the width 59b of the bottom surface 28b may be in a range of 0.418 to 0.458 inches. The smaller sized bottom surface 28b reduces the amount of material needed to manufacture the ground bar 12b, thereby decreasing its manufacturing cost. The two bottom flanges 38b and 40b are shaped to allow other devices, such as conductive or isolative brackets, to grasp onto them, while at the same time providing a reduced amount of material to reduce manufacturing cost.

FIG. 5 illustrates a partial bottom perspective view of the universal ground bar assembly 10 of FIG. 1 showing one of the mounting brackets 14 detached from the ground bar 12. Both mounting brackets 14 and 16 of FIG. 1 are identically configured and attached to the opposite ends 15 and 17 of the ground bar 12. The mounting brackets 14 and 16 of FIG. 1 are made of a conductive material such as bare copper, tin-plated copper, aluminum, tin-plated aluminum, bronze, or other types of conductive material to electrically bond the ground bar 12 to the mounting surface 18 to pass the electrical charge running through the ground bar 12 through the mounting brackets 14 and 16 and into the mounting surface 18, which may comprise a panel of an electrical or control unit. As shown in FIG. 5, each mounting bracket 14 (only one is shown) comprises a top surface 90 and curved opposed side walls 92 and 94 extending at non-parallel angles from the top surface 90 in a generally U-shape with two flanges 96 and 98 extending from the opposed side walls 92 and 94. The two flanges 96 and 98 are generally parallel to the top surface 90. The top surface 90 contains a top surface hole 100, and the two flanges 96 and 98 each contain respective flange holes 102 and 104.

A separate mounting bracket screw 106 (only one is shown) is configured to directly attach each respective mounting bracket 14 to the ground bar 12 by extending the mounting bracket screw 106 through the top surface hole 100 into the threaded end hole 70 in the bottom surface 28. As shown in FIG. 1, the mounting brackets 14 and 16 are attached, with their longitudinal axis 107 and 109 disposed perpendicular to a longitudinal axis 108 of the ground bar 12, at the opposite ends 15 and 17 of the ground bar 12 between the ground bar 12 and the attached mounting surface 18. In other embodiments, the mounting brackets 14 and 16 may be attached at varying orientations relative to the ground bar 12. Additional mounting bracket screws 106, as shown in FIG. 1, extend through the respective flange holes 102 and 104, as shown in FIGS. 1 and 5, in the two flanges 96 and 98 of each mounting bracket 14 and 16 attaching the mounting brackets 14 and 16 to the mounting surface 18. In such manner, by attaching the mounting brackets 14 and 16 between the ground bar 12 and the mounting surface 18, the ground bar 12 is spaced apart from the mounting surface 18 allowing for additional space for greater accessibility to the ground bar 12 making it easier to run wires or terminations to the ground bar 12.

FIG. 6 illustrates a partial top perspective view of the universal ground bar assembly 10 of FIG. 1 showing an isolative mounting bracket 110 attached to the end 15 of the ground bar 12. FIG. 7 illustrates the view of FIG. 6 with the isolative mounting bracket 110 detached from the end 15 of the ground bar 12. The isolative mounting bracket 110 is made of a non-conductive material such as plastic in order to electrically isolate the ground bar 12 from the mounting surface 18, shown in FIG. 6, to prevent the electrical charge running through the ground bar 12 from passing through the isolative mounting bracket 110 into the mounting surface 18. As shown in FIGS. 6 and 7, the isolative mounting bracket 110 comprises two parallel end walls 112 and 114, two parallel opposed outer side walls 116 and 118, opposed top and bottom surfaces 120 and 122, and an intermediate wall 124. The opposed outer side walls 116 and 118 are each completely disposed in separate respective planes. A slot 126 extends through the top surface 120. The slot 126 is defined by opposed top slot walls 128 and 129, opposed side slot walls 130 and 132 extending from the opposed top slot walls 128 and 129, and a bottom slot wall 134 extending between the opposed side slot walls 130 and 132. The opposed side slot walls 130 and 132 are non-parallel to, and in this particular embodiment perpendicular to, the top slot walls 128 and 129 and the bottom slot wall 134. The opposed side slot walls 130 and 132 each extend a same length 133 as the top surface 120, and are disposed parallel to the parallel outer side walls 116 and 118. One end 135 of the slot 126 is open and the other end 137 of the slot 136 is blocked by a slot ledge 138 centered between the opposed side slot walls 130 and 132. A mounting hole 140 extends through the bottom surface 122 beyond the slot 126 between the opposed side slot walls 130 and 132.

The isolative mounting bracket 110 is attached to end 15 of the ground bar 12 by sliding the slot 126 in direction 142 over the bottom surface 28 and the oppositely disposed bottom flanges 38 and 40 of the ground bar 12 until the slot ledge 138 abuts against the end 22 of the ground bar 12 preventing the isolative mounting bracket 110 from moving further in direction 142. As shown in FIGS. 2, 6, and 7, the width 59 of the bottom surface 28 of the ground bar 12 is less than the width 144 between the side slot walls 130 and 132 but greater than the width 146 between ends 147 and 149 of the top slot walls 128 and 129. The width 146 between the ends 147 and 149 of the top slot walls 128 and 129 is greater than the width 148 between the opposed parallel side walls 30 and 32 of the ground bar 12. As a result, the configuration of the slot 126 and the configuration of the ground bar 12 allows for the isolative mounting bracket 110 to be attached to the ground bar 12 without using screws thereby conforming to the shape of the extruded ground bar 12. An identical isolative mounting bracket 110 (not shown) may be attached to the other end 17 (shown in FIG. 1) of the ground bar 12.

After isolative mounting brackets 110 are attached to both ends 15 and 17 (shown in FIG. 1) of the ground bar 12, the isolative mounting brackets 110 are attached to the mounting surface 18 (shown in FIG. 6) by extending respective mounting bracket screws 106 (only one is shown) through the mounting hole 140 in each isolative mounting bracket 110 into the mounting surface 18 thereby preventing each isolative mounting bracket 110 from sliding off the ground bar 12. When the isolative mounting brackets 110 are attached to the ground bar 12, the mounting hole 140 of each isolative mounting bracket 110 is disposed along the longitudinal axis 108 of the ground bar 12 beyond the respective parallel end surfaces 22 and 24 (shown in FIG. 1) of the ground bar 12. This configuration provides a more stabile attachment than if the mounting holes 140 were disposed in the isolative mounting brackets 110 to the sides 141 and 143 of the ground bar 12 because it assures that the isolative mounting brackets 110 cannot rotate out of position thereby preventing the ground bar 12 from sliding out of the isolative mounting brackets 110. By attaching the isolative mounting brackets 110 between the ground bar 12 and the mounting surface 18, the ground bar 12 is spaced apart from the mounting surface 18 allowing for additional space for greater accessibility to the ground bar 12 making it easier to run wires or terminations to the ground bar 12. The isolative mounting brackets 110 are also configured to attach to the bottom flanges 38*b* and 40*b* of the ground bar 12*b* of the embodiment of FIG. 4.

Figure 8:
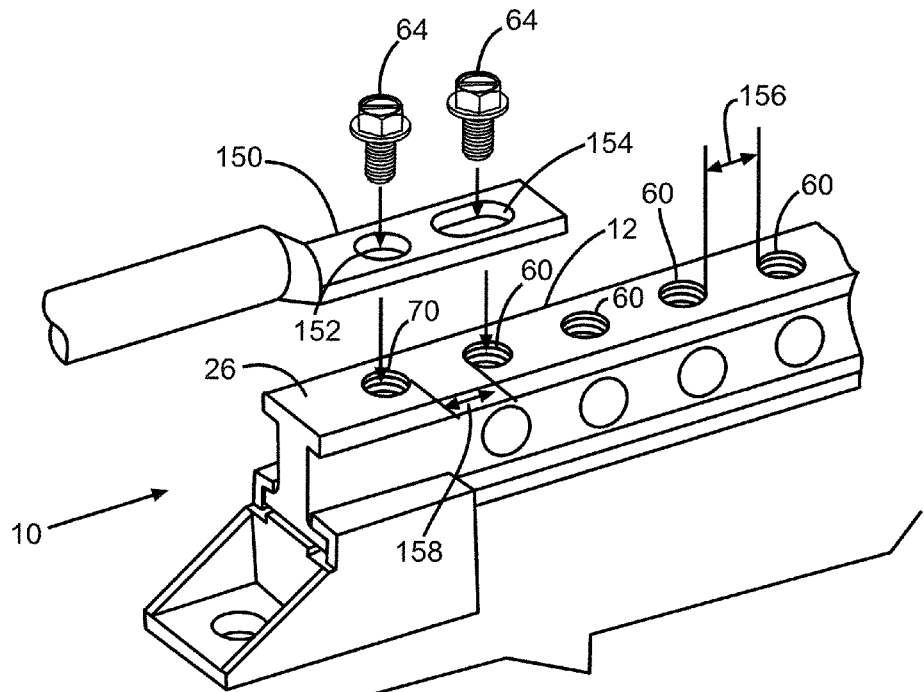
FIG. 8 illustrates the view of the universal ground bar assembly of FIG. 6 showing a standard 2-hole lug being attached to the ground bar.

FIG. 8 illustrates the view of the universal ground bar assembly 10 of FIG. 6 showing a standard 2-hole lug 150 being attached to the ground bar 12. Screws 64 are extended through holes 152 and 154 in the standard 2-hole lug 150 into, respectively, one of the top threaded holes 60 and into one of the top threaded end holes 70 in the top surface 26 of the ground bar 12. The eighteen top threaded holes 60 are spaced apart from each other by a distance 156 of 0.31 inches, and each top threaded end hole 70 is spaced apart from the adjacent top threaded hole 60 by a distance 158 of 0.375 inches. The spacing of the holes 60 and 70 is designed to accommodate standard 2-hole lugs 150. In other embodiments, the spacing of the holes 60 and 70 may be varied to accommodate other devices.

Figure 9:
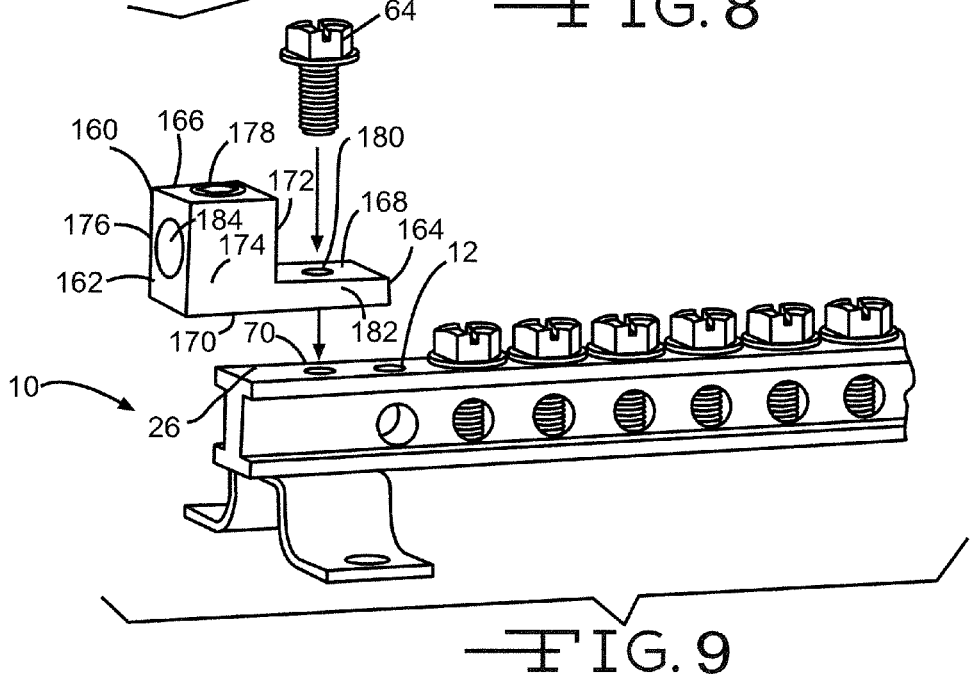
FIG. 9 illustrates a partial top perspective end view of the universal ground bar assembly of FIG. 1 with a main conductor block being attached to the ground bar.

FIG. 9 illustrates a partial top perspective end view of the universal ground bar assembly 10 of FIG. 1 with a main conductor block 160 being attached to the ground bar 12. The main conductor block 160 comprises parallel end surfaces 162 and 164, two parallel top surfaces 166 and 168 and a parallel bottom surface 170, an intermediary surface 172 which is parallel to the end surfaces 162 and 164, and parallel side surfaces 174 and 176. Threaded hole 178 extends from the top surface 166 through the bottom surface 170. Threaded hole 180 extends from the top surface 168 into the cross-section 182 without passing through the bottom surface 170. Side hole 184 extends from the end surface 162 into the cross-section 182 intersecting the threaded hole 180 within the cross-section 182 without passing through the intermediary surface 172. Screw 64 extends through the threaded hole 180 in the main conductor block 160 into the top threaded end hole 70 in the top surface 26 of the ground bar 12 in order to attach the main conductor block 160 to the top surface 26 of the ground bar 12.

Figure 10:
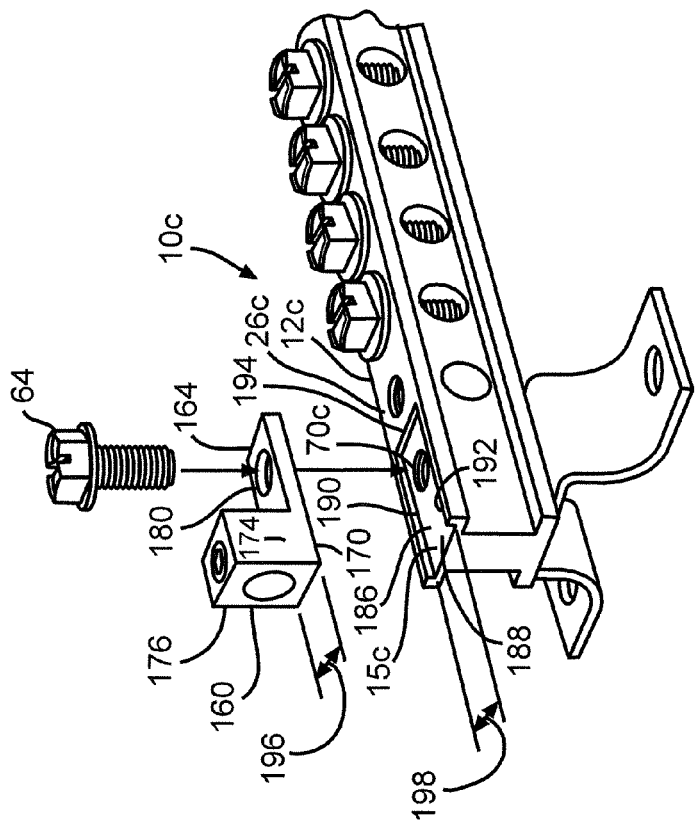
FIG. 10 illustrates a partial top perspective end view of another embodiment of a universal ground bar assembly, having an anti-rotation feature, with a main conductor block being attached to the ground bar.

FIG. 10 illustrates a partial top perspective end view of another embodiment of a universal ground bar assembly 10c, having an anti-rotation feature, with a main conductor block 160 being attached to the ground bar 12c. The universal ground bar assembly 10c of FIG. 10 is identical to the universal ground bar assembly 10 of the embodiment of FIG. 1 with the exception that opposed ends 15c (the other end is not shown) of the top surface 26c of the ground bar 12c are each defined by an identical anti-rotation slot 186. Each identical anti-rotation slot 186 comprises an open slot end 188, opposed parallel slot side walls 190 and 192, and a slot end wall 194 extending between the opposed parallel slot side walls 190 and 192. The width 196 of the bottom surface 170 of the main conductor block 160 is less than the width 198 between the slot side walls 190 and 192.

When the conductor block 160 is disposed against the top surface 26c between the opposed slot side walls 190 and 192 of the ground bar 12c and the threaded hole 180 in the main conductor block 160 is overlapped with the top threaded end hole 70c in the top surface 26c between the opposed slot side walls 190 and 192 of the ground bar 12c, a screw 64 may be extended through the overlapping holes 180 and 70c to attach the main conductor block 160 to the top surface 26c of the ground bar 12c. In this position, the slot side walls 190 and 192 abut against the side surfaces 174 and 176 of the main conductor block 160 and the slot end wall 194 abuts against the end surface 164 of the main conductor block 160 preventing the main conductor block 160 from rotating relative to the ground bar 12c. The slot 186 may be machined in the top surface 26c of the ground bar 12c. In other embodiments, the slot 186 may be manufactured in varying ways.

Figure 11:
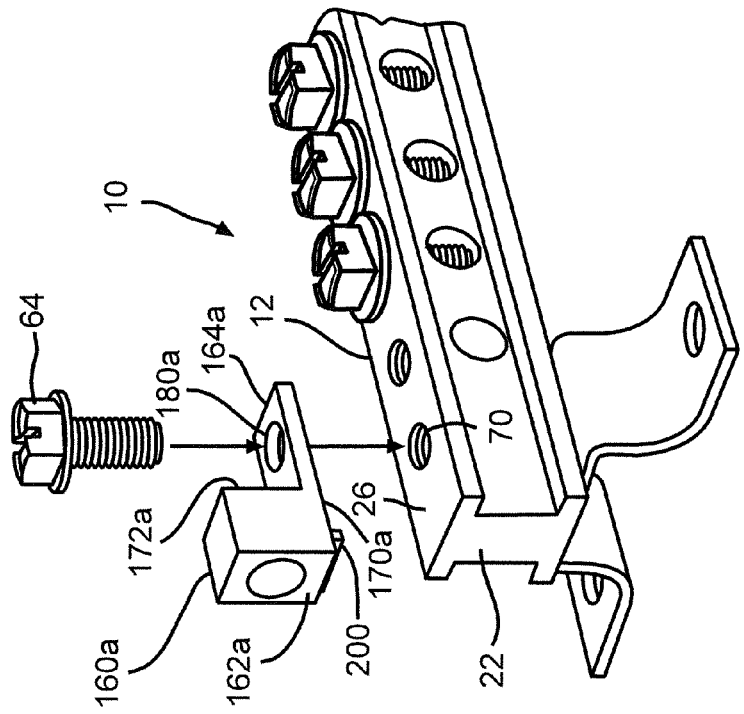
FIG. 11 illustrates a partial top perspective end view of the universal ground bar assembly of FIG. 1 with a varied main conductor block, having an anti-rotation feature, being attached to the ground bar.

FIG. 11 illustrates a partial top perspective end view of the universal ground bar assembly 10 of FIG. 1 with a varied main conductor block 160a, having an anti-rotation feature, being attached to the ground bar 12. The varied main conductor block 160a is identical to the main conductor block 160 of FIG. 9 with the exception that an anti-rotation ledge 200 extends from the bottom surface 170a of the varied main conductor block 160a. The anti-rotation ledge 200 is parallel to the parallel end surfaces 162a and 164a and the intermediary surface 172a of the varied main conductor block 160a.

When the bottom surface 170a of the varied main conductor block 160a is disposed against the top surface 26 of the ground bar 12 and the anti-rotation ledge 200 of the varied main conductor block 160 is abutted, in parallel formation, against the end surface 22 of the ground bar 12, the threaded hole 180a in the varied main conductor block 160a overlaps the top threaded end hole 70 in the top surface 26 of the ground bar 12. A screw 64 may then be extended through the overlapping holes 180a and 70 to attach the varied main conductor block 160a to the ground bar 12 without the main conductor block 160a rotating relative to the ground bar 12 due to the anti-rotation ledge 200 of the main conductor block 160a abutting against the end surface 22 of the ground bar 12.

Figure 12:
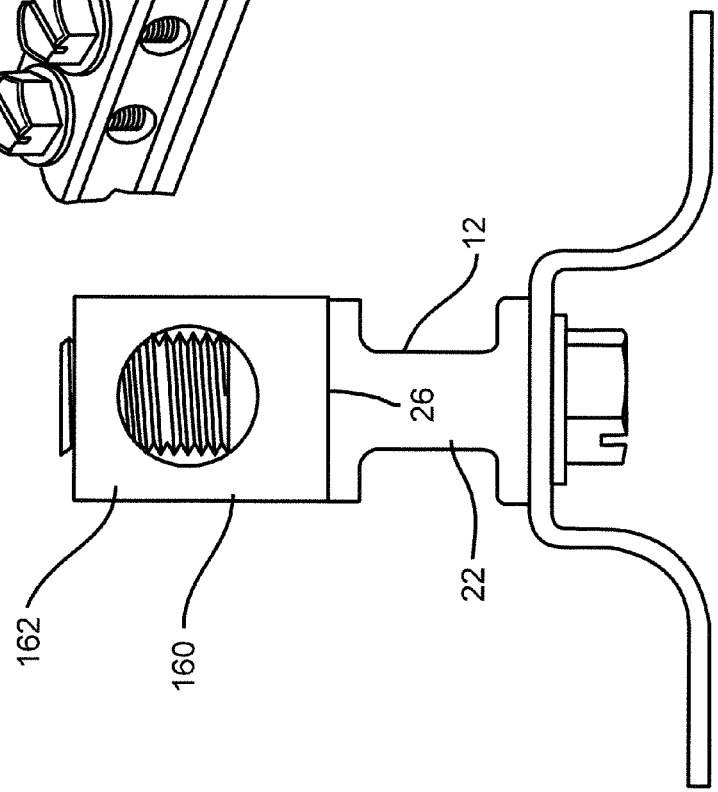
FIG. 12 illustrates a side view of the embodiment of FIG. 9.

FIG. 12 illustrates a side view of the embodiment of FIG. 9. As shown in FIG. 12, the main conductor block 160 in this configuration is disposed so that the end surface 162 of the main conductor block 160 is disposed to be parallel to the end surface 22 of the ground bar 12 when the screw 64 (shown in FIG. 9) extends through the threaded hole 180 (shown in FIG. 9) in the main conductor block 160 into the top threaded end hole 70 (shown in FIG. 9) in the top surface 26 of the ground bar 12 in order to attach the main conductor block 160 to the top surface 26 of the ground bar 12.

Figure 13:
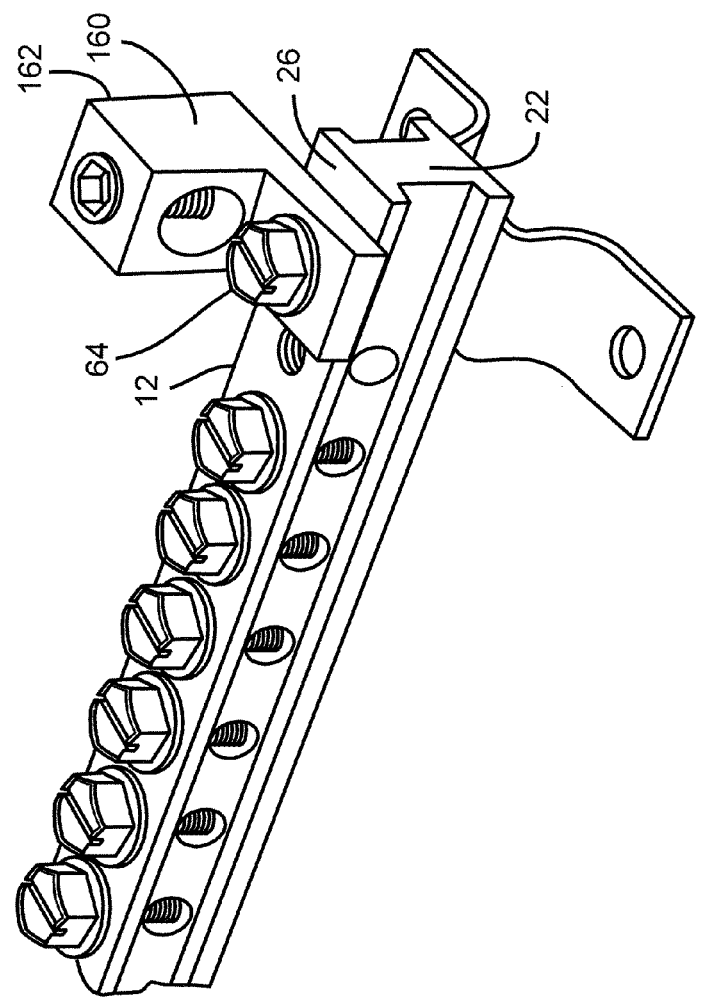
FIG. 13 illustrates another partial top perspective view of the embodiment of FIG. 9 with the exception that the main conductor block has been attached to the ground bar in a different orientation.

FIG. 13 illustrates another partial top perspective view of the embodiment of FIG. 9 with the exception that the main conductor block 160 has been attached to the ground bar 12 in a different orientation. As shown in FIG. 13, the main conductor block 160 in this configuration is disposed so that the end surface 162 of the main conductor block 160 is disposed to be perpendicular to the end surface 22 of the ground bar 12 when the screw 64 extends through the threaded hole 180 (shown in FIG. 9) in the main conductor block 160 into the top threaded end hole 70 (shown in FIG. 9) in the top surface 26 of the ground bar 12 in order to attach the main conductor block 160 to the top surface 26 of the ground bar 12. FIGS. 12 and 13 demonstrate that the configuration of the ground bar 12 allows for the main conductor block 160 to be attached to the ground bar 12 in varying orientations.

FIG. 14 illustrates a partial side view of the ground bar 12 of FIG. 1 showing the attachment of varying types of conductive terminations to the ground bar 12. The top threaded holes 60, corresponding side holes 78, and top threaded end holes 70 (see FIG. 1) of the universal ground bar 12 are configured to accommodate varying sized and type terminals (ring or fork) 202, ferrules 206, bare wires 216, or compression connectors 222 at virtually any portion of the universal ground bar 12.

FIG. 15 illustrates a partial top perspective view of the ground bar 12 of FIG. 1 showing a screw 64 and ring terminal 202 detached from the ground bar 12. As shown in FIGS. 14 and 15, a ring terminal 202 is attached to the ground bar 12 by threading one of the screws 64, with the optimum torque, through a hole 204 in the ring terminal 202 into one of the top threaded holes 60 of the top surface 26 of the ground bar 12 to press the ring terminal 202 against the top surface 26 in order to pass an electrical charge of the ring terminal 202 into the conductive material of the ground bar 12. The screw 64 has a hexagonal end 66 with a slot 68 which allows rotation of the screw 64 with a rotating device 205 comprising a screw-driver or wrench. The large width 42 of the parallel top surface 26 allows for a large contact area to land ring terminals 202. A fork terminal may be attached to the ground bar 12 by following the same attachment process as for the ring terminal 202.

Figure 16:
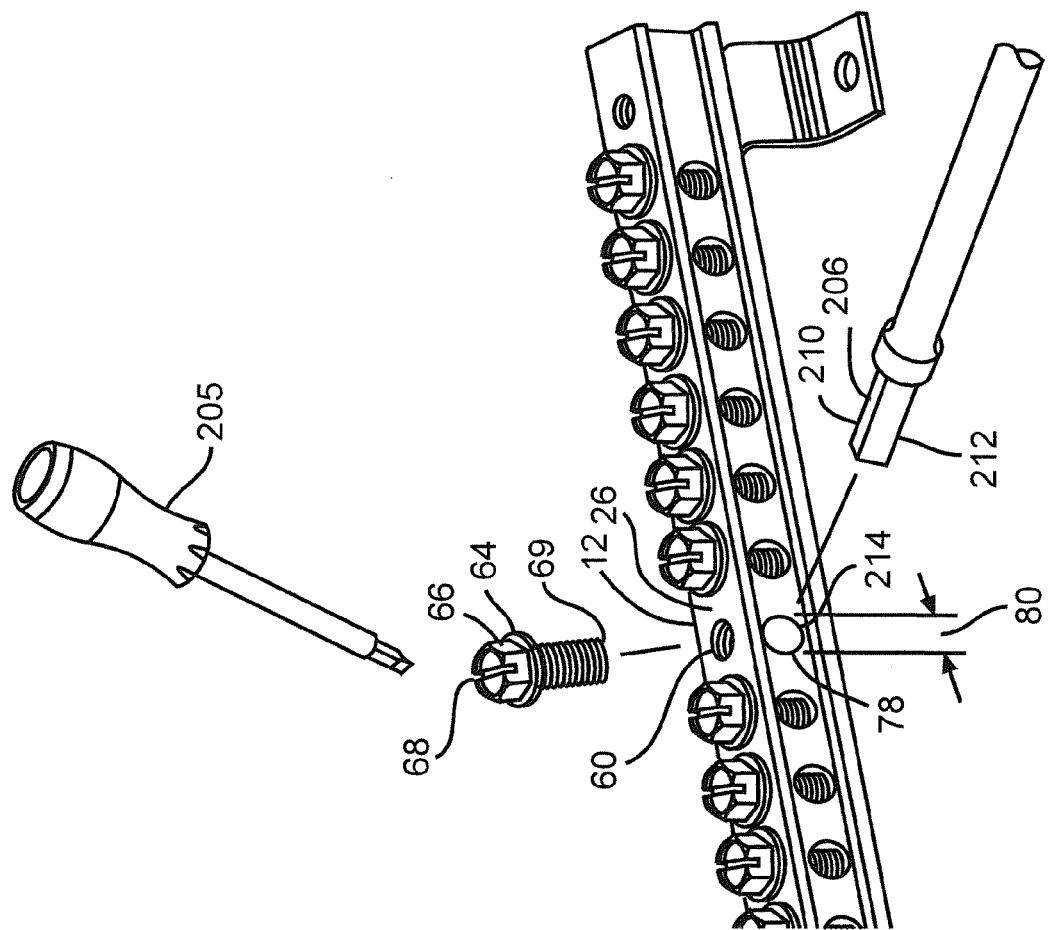
FIG. 16 illustrates a partial top perspective view of the universal ground bar assembly of FIG. 1 showing a screw and ferrule detached from the ground bar.

FIG. 16 illustrates a partial top perspective view of the universal ground bar assembly 10 of FIG. 1 showing a screw 64 and ferrule 206 detached from the ground bar 12. As shown in FIGS. 14 and 16, a ferrule 206 is attached to the ground bar 12 by inserting the ferrule 206 through one of the side holes 78 of the ground bar 12 and threading one of the screws 64, with the optimum torque, through one of the top threaded holes 60 of the top surface 26 of the ground bar 12 until a bottom end 69 of the screw 64 presses against a top surface 210 of the ferrule 206 firmly pressing a bottom surface 212 of the ferrule 206 against a bottom portion 214 of the side hole 78 of the ground bar 12. The screw 64 has a hexagonal end 66 with a slot 68 which allows rotation of the screw 64 with a rotating device 205 comprising a screw-driver or wrench. The bottom end 69 of the screw 64 is chamfered with a flat bottom surface assisting in the connection of the bottom surface 212 of the ferrule 206 to the bottom portion 214 of the side hole 78 of the ground bar 12. This attachment allows the passing of an electrical charge of the ferrule 206 into the conductive material of the ground bar 12. The large diameter 80 of the side holes 78 allows large or small ferrules to be attached within the side holes 78 of the ground bar 12.

Figure 17:
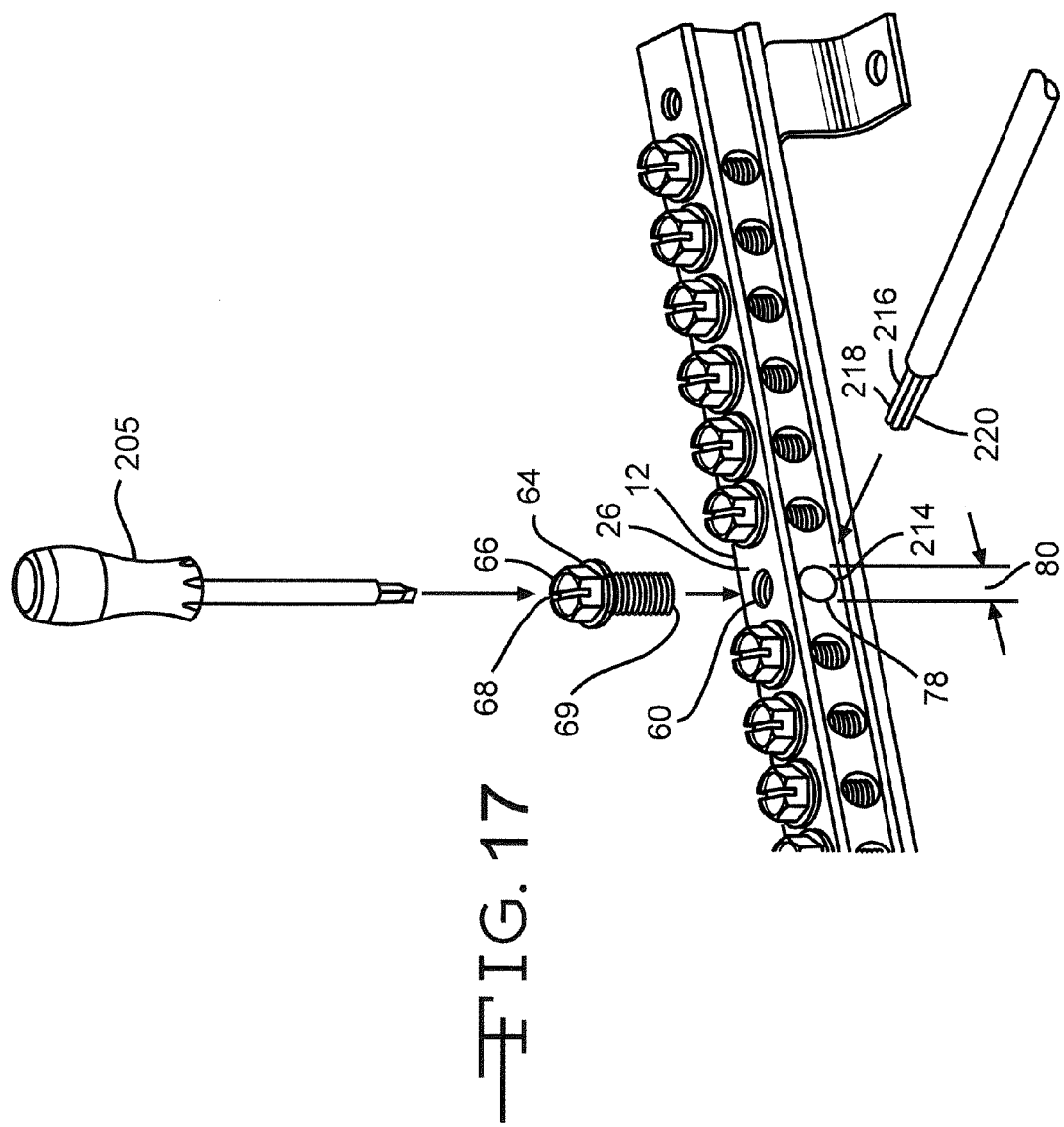
FIG. 17 illustrates a partial top perspective view of the universal ground bar assembly of FIG. 1 showing a screw and bare wire detached from the ground bar.

FIG. 17 illustrates a partial top perspective view of the universal ground bar assembly 10 of FIG. 1 showing a screw 64 and bare wire 216 detached from the ground bar 12. As shown in FIGS. 14 and 17, a bare (or stripped) wire 216 is attached to the ground bar 12 by inserting the bare wire 216 through one of the side holes 78 of the ground bar 12 and threading one of the screws 64, with the optimum torque, through one of the top threaded holes 60 of the top surface 26 of the ground bar 12 until a bottom end 69 of the screw 64 presses against a top surface 218 of the bare wire 216 firmly pressing a bottom surface 220 of the bare wire 216 against a bottom portion 214 of the side hole 78 of the ground bar 12. The screw 64 has a hexagonal end 66 with a slot 68 which allows rotation of the screw 64 with a rotating device 205 comprising a screw-driver or wrench. The bottom end 69 of the screw 64 is chamfered with a flat bottom surface assisting in the connection of the bottom end 69 of the bare wire 216 to the bottom portion 214 of the side hole 78 of the ground bar 12. This attachment allows the passing of an electrical charge of the bare wire 216 into the conductive material of the ground bar 12. The large diameter 80 of the side holes 78 allows large or small bare wires 216 to be attached within the side holes 78 of the ground bar 12. Bare wires 216 require less diameter 80 side holes 78 than ferrules 206 of the same gage.

Figure 18:
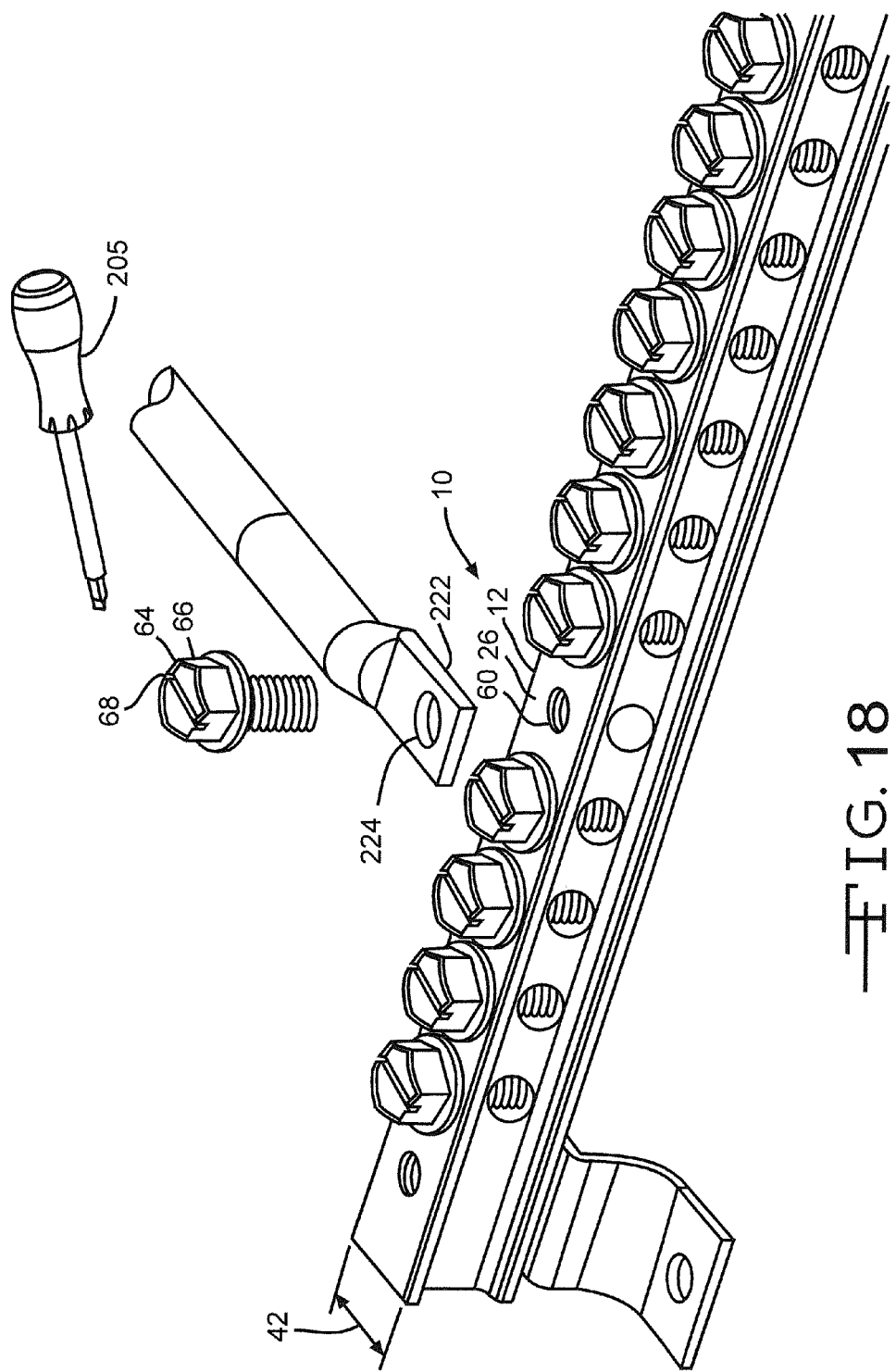
FIG. 18 illustrates a partial top perspective view of the universal ground bar assembly of FIG. 1 showing a screw and compression connector detached from the ground bar.

FIG. 18 illustrates a partial top perspective view of the universal ground bar assembly 10 of FIG. 1 showing a screw 64 and compression connector 222 detached from the ground bar 12. As shown in FIGS. 14 and 18, a compression connector 222 such as a one-hole compression lug is attached to the ground bar 12 by threading one of the screws 64, with the optimum torque, through a hole 224 in the compression connector 222 into one of the top threaded holes 60 of the top surface 26 of the ground bar 12 to press the compression connector 222 against the top surface 26 in order to pass an electrical charge of the compression connector 222 into the conductive material of the ground bar 12. The screw 64 has a hexagonal end 66 with a slot 68 which allows rotation of the screw 64 with a rotating device 205 comprising a screw-driver or wrench. The large width 42 of the parallel top surface 26 allows for a large contact area to land compression connectors 222.

One or more embodiments of the disclosure may reduce one or more problems of the prior ground bars by allowing one or more of the following: providing for the acceptance of differing types of conductive terminations such as a stripped wire, a ferrule, a ring or fork terminal, and a compression connector; providing conductive mounting brackets which directly attach to the ground bar to space apart the ground bar from a mounting surface; providing isolative mounting brackets which allow the attachment of the isolative mounting brackets to a ground bar without fasteners; or providing anti-rotation features to prevent conductor blocks from rotating while being attached to a ground bar.

It should be understood, of course, that the foregoing relates to exemplary embodiments of the disclosure and modifications may be made without departing from the spirit and scope of the disclosure.

The invention claimed is:

1. A ground bar assembly comprising a ground bar and a conductor block configured to be attached to the ground bar, the ground bar having a top surface comprising an anti-rotation slot comprising opposed slot side walls for preventing rotation of the conductor block, the ground bar having a ground bar hole disposed in the top surface between the opposed slot side walls.

2. The ground bar assembly of claim 1 wherein the anti-rotation slot further comprises a slot end wall extending between the opposed slot side walls.

3. The ground bar assembly of claim 1 wherein the anti-rotation slot is disposed at one end of the ground bar.

4. The ground bar assembly of claim 1 wherein one end of the anti-rotation slot is open.

5. The ground bar assembly of claim 1 wherein the conductor block further comprises a conductor block hole configured to overlap the ground bar hole when the conductor block is disposed against the top surface between the opposed slot side walls.

6. A ground bar assembly comprising a ground bar and a conductor block configured to be attached to the ground bar, the conductor block comprising an anti-rotation ledge extending from a bottom surface of the conductor block for abutting against a surface of the ground bar to prevent rotation of the conductor block.

7. The ground bar assembly of claim 6 wherein the ground bar further comprises a top surface and an end surface, wherein when the bottom surface of the conductor block is disposed against the top surface of the ground bar the anti-rotation ledge abuts against the end surface of the ground bar preventing rotation of the conductor block.

8. The ground bar assembly of claim 7 wherein when the anti-rotation ledge abuts against the end surface of the ground bar, preventing rotation of the conductor block, the anti-rotation ledge is disposed parallel to the end surface.

9. The ground bar assembly of claim 6 wherein the ground bar further comprises a ground bar hole, and the conductor block further comprises a conductor block hole configured to overlap the ground bar hole when the anti-rotation ledge is abutted against the surface of the ground bar preventing rotation of the conductor block.

10. The ground bar assembly of claim 9 further comprising a screw which is configured to extend through the conductor block hole into the ground bar hole to secure the conductor block to the ground bar when the bottom surface of the conductor block is disposed against a top surface of the ground bar and the anti-rotation ledge is abutted against an end surface of the ground bar preventing rotation of the conductor block.

* * * * *